United States Patent [19]

Schneider

[11] Patent Number: 4,664,813
[45] Date of Patent: May 12, 1987

[54] METHOD AND APPARATUS FOR DRYING SLUDGE USING MOVABLE PLATES

[76] Inventor: John R. Schneider, 26 Cove Rd., Belvedere, Calif. 94920

[21] Appl. No.: 780,555

[22] Filed: Sep. 26, 1985

[51] Int. Cl.⁴ .................... B01D 29/02; B01D 37/00; C02F 11/12
[52] U.S. Cl. .................... 210/771; 210/772; 210/808; 210/387; 210/399; 210/400; 34/15; 34/217; 34/242
[58] Field of Search ............... 210/791, 808, 386, 387, 210/391, 398, 399, 400, 771, 772, 770; 34/15, 85, 216, 217, 242

[56] References Cited

U.S. PATENT DOCUMENTS

| | | | |
|---|---|---|---|
| 3,443,695 | 5/1969 | O'Neill | 210/387 |
| 3,899,426 | 8/1975 | Hirs | 210/400 |
| 4,267,060 | 5/1981 | Miller | 210/791 |

Primary Examiner—Richard V. Fisher
Assistant Examiner—Linda S. Evans
Attorney, Agent, or Firm—Owen, Wickersham & Erickson

[57] ABSTRACT

A method and apparatus for dewatering and drying sludge. A pair of upper and lower members form a closed chamber into which sludge is poured. Sidewalls of the upper member are pressed against the lower member to seal the chamber. Compressed air supplied at a pressure $P_1$ to a continuous groove in the lower edge of the sidewalls flows across the sloped inside surfaces of the sidewalls and supplements air supplied to the chamber at a somewhat lower pressure level $P_2$, the combined pressures $P_1$ and $P_2$ in said chamber forcing liquid from said sludge through porous media in the bottom of the chamber. Air from the continuous groove aids in releasing the dried sludge from the chamber when the upper and lower members are separated.

5 Claims, 5 Drawing Figures

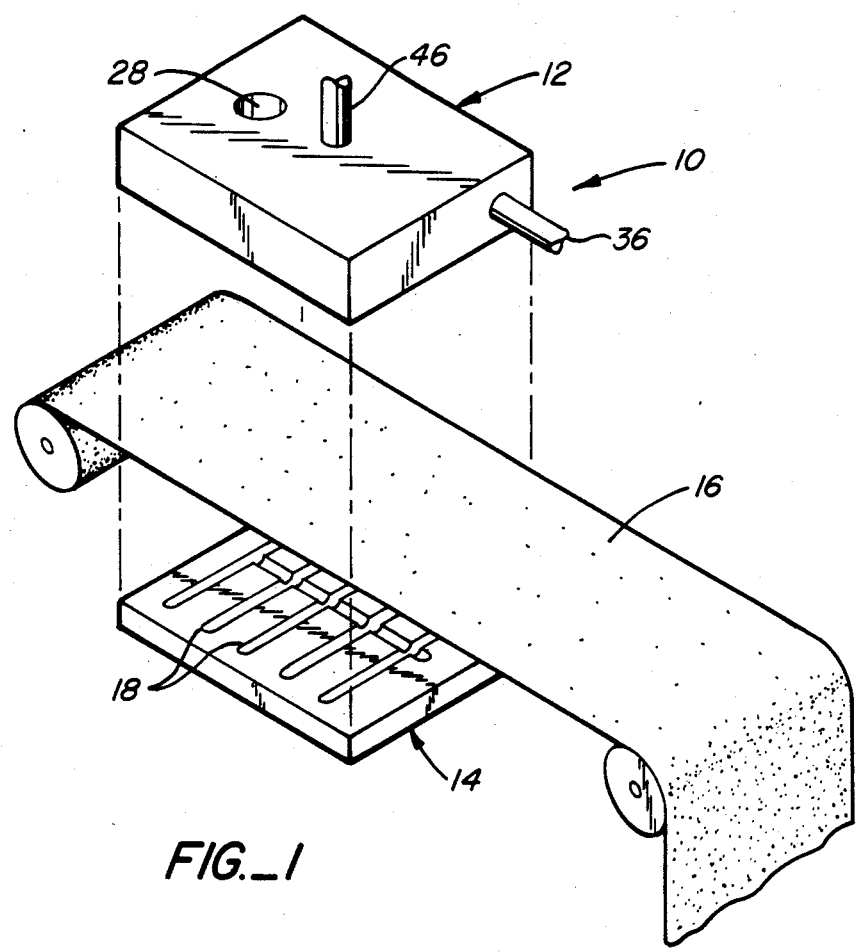
FIG._1
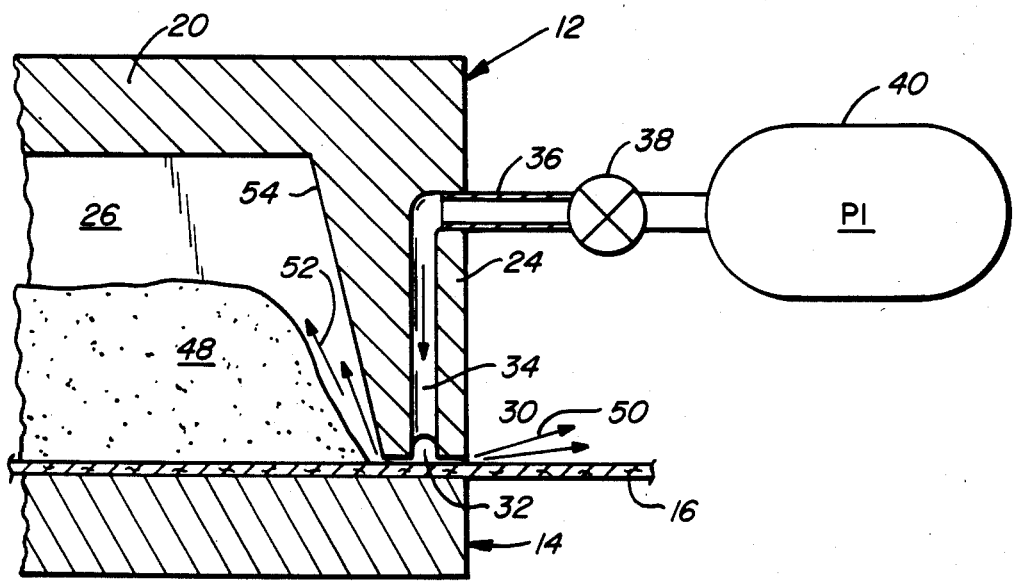
FIG._2.

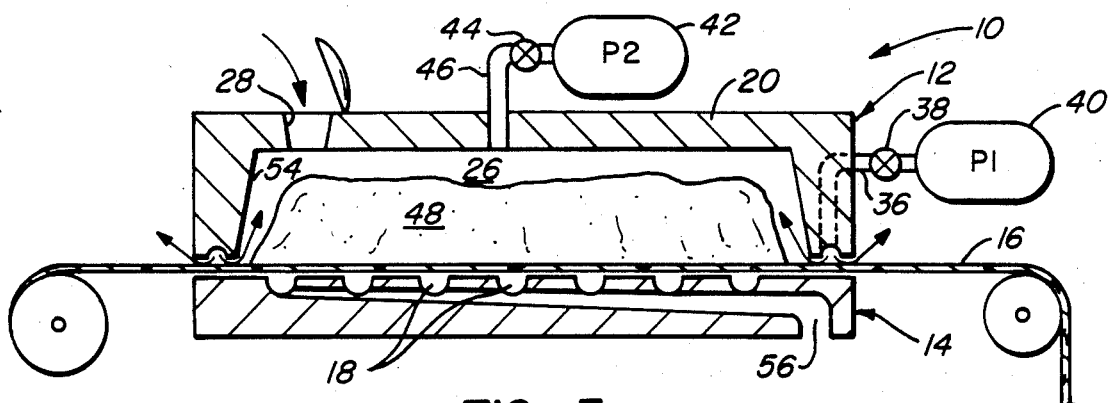
FIG._3.
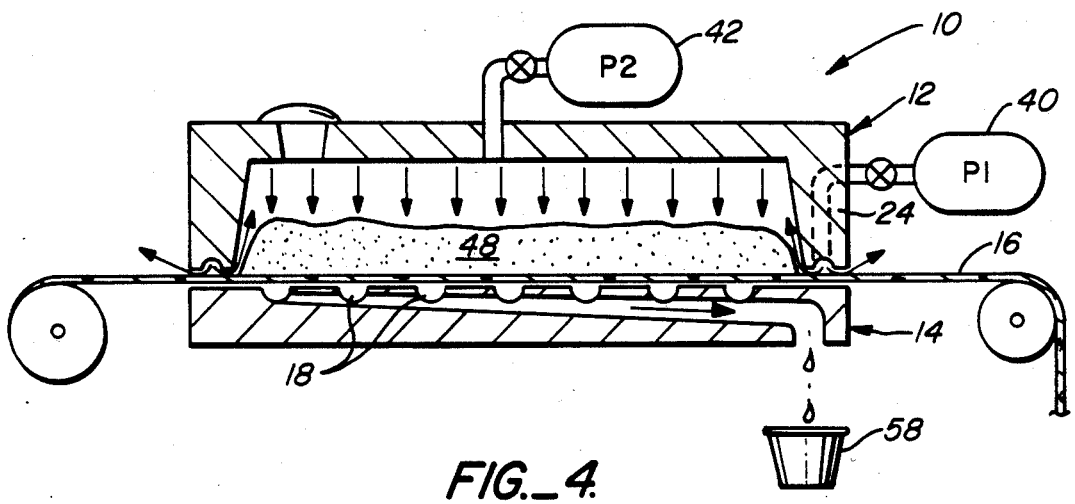
FIG._4.
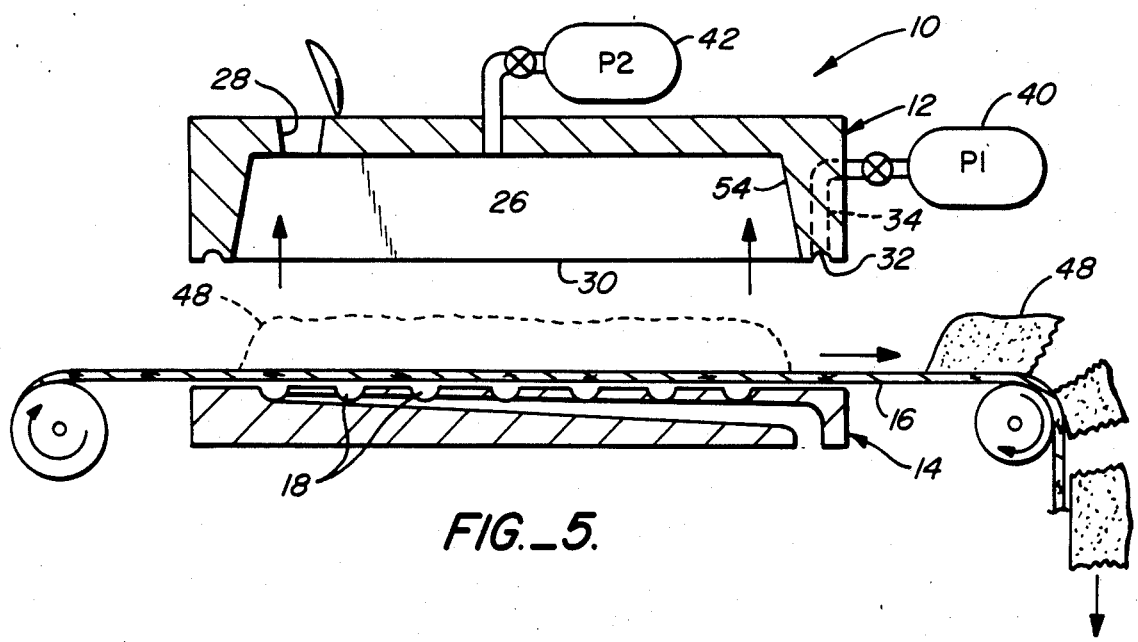
FIG._5.

METHOD AND APPARATUS FOR DRYING SLUDGE USING MOVABLE PLATES

This invention relates to apparatus for removing liquids from and at least partially drying sludge materials so that they can be more readily used or disposed.

BACKGROUND OF THE INVENTION

In many industrial processes, waste materials in the form of a sludge are collected at a constant rate. At some point the accumulated sludge must be periodically disposed of or refined, particularly if the sludge contains deleterious substances. An example of this sludge accumulation problem occurs in many industrial plants and municipal treatment plants. In such installations, the accumulation of sludge occurs at a relatively high rate, often contains hazardous waste products and therefore must be disposed of in specially constructed waste dumps. Often, the acceptable dump sites for such sludge are located at substantial distances from the accumulation sites. Therefore, if the sludge can be dried or if the major percentage of liquid in the sludge can be removed, the cost of transporting the residual dried sludge and the volume of sludge required to be disposed of in a dump site can be greatly reduced. The present invention provides an apparatus that helps to solve this problem.

Accordingly, one object of the present invention is to provide an apparatus that will remove the liquid from sludge materials and convert it to an essentially dry form that can either be reused or more easily transported to a dump site.

Another object of the invention is to provide an apparatus for drying sludge materials comprised of a pair of plates that can be brought together to form a chamber for receiving the raw sludge material, a groove in the sidewall of one plate and source of air pressure connected to the groove so that air will flow from it inwardly and upwardly along the inside surfaces of the plate sidewalls, thereby sealing the chamber for the sludge and increasing the internal pressure that causes liquid to be removed from it.

Another object of the invention is to provide a method for removing moisture or liquid from sludge to dry it into a cake form and also to remove from it deleterious and hazardous waste products.

Still another object of the invention is to provide a separable plate-type apparatus for drying sludge wherein a pair of plate members form a drying chamber and are sealed by a peripheral groove connected to an air pressure source that also prevents the sludge from adhering to the plate sidewalls when the plates are separated.

SUMMARY OF THE INVENTION

In accordance with the principles of the invention, an apparatus similar to plate-type filter is provided comprised of at least one pair of upper and lower rigid plates which are movable together to form a sealed chamber. The lower plate has perforations and supports a layer of porous media such as a filter paper. The upper plate has sidewalls that engage the media and form the receiving chamber. With the plates held together by an appropriate mechanism, a quantity of sludge to be dried is supplied to the chamber. The drying process commences when air at a pressure $P_{12}$ is supplied to the chamber above the sludge. This pressure forces liquid from the sludge which passes through the porous media and the perforations in the lower plate to a suitable liquid collection system. During the drying process, as the pressure $P_{12}$ is applied, additional air at a somewhat higher pressure $P_{11}$ is supplied through a sidewall inlet to a continuous groove in the lower edge of the upper plate sidewalls. This air under pressure $P_{11}$ provides several advantageous results. First of all, it seals the periphery of the upper plate by preventing any liquid inside the closed chamber from passing under the surrounding wall. Secondly, it creates a flow of air inwardly into the chamber which forms a separating layer on the inside walls of the chamber that keeps the drying cake therein from building up against and adhering to the chamber walls.

In cases where the sludge may contain heavy concentrations of unwanted or hazardous products, the same charge of sludge may be washed or recycled by supplying additional quantities of water to the chamber before the final drying cycle is completed. The unwanted products are thus removed from the solids of the sludge and are carried away by the water removed therefrom.

Other objects, advantages and features of the invention will become apparent from the following detailed description thereof presented in conjunction with the accompanying drawing.

BRIEF DESCRIPTION OF THE DRAWING

FIG. 1 is a diagrammatic view in perspective of a sludge drying apparatus according to the invention.

FIG. 2 is an enlarged fragmentary view in elevation and in section showing a portion of the sludge drying apparatus of FIG. 1 in operation.

FIGS. 3–5 are views in elevation and in section showing a sludge drying apparatus according to the invention at various stages of a drying cycle.

DETAILED DESCRIPTION OF EMBODIMENT

With reference to the drawing, FIG. 1 shows diagrammatically an apparatus 10 for dewatering or drying sludge such as may be produced during various manufacturing processes or from municipal waste plants. In either case, the sludge material extracted usually accumulates at a high rate and often contains hazardous or toxic chemicals. This requires that the sludge, when accumulated, be transported to specified dump sites. If water can be removed from the sludge, it will be lighter and more manageable and thus less costly to move. Moreover, if toxic substances can be removed, the choice of dump sites for the dried residue can be greatly expanded.

In general, the apparatus comprises a pair of upper and lower plate members 12 and 14 which are movable together and apart during cycles of the apparatus by a suitable mechanism (not shown). Such a mechanical arrangement for manipulating these plate members may be similar to that shown in my U.S. Pat. No. 4,289,615 showing a plate-type filter system.

In the present apparatus, a carrier sheet 16 of porous material such as a paper-type filter media is supplied from a roll and extends across the lower plate member. A suitable means (not shown) for advancing the carrier sheet is provided.

The lower plate member 12 is provided with a pattern of recesses 18 in the upper surface which serve to receive, collect and remove the liquid from the sludge which is forced out of it.

The upper plate member 14 has a transverse portion 20 having the same shape and size as the lower plate member and downwardly extending sidewalls and end walls 24. When the two plates are pressed together, as shown in FIG. 2, the sidewalls and end walls form an enclosed chamber 26. An opening 28 with a suitable closure is provided in the transverse portion of the upper plate member through which sludge can be poured or pumped to partially fill the chamber 26.

As shown in FIG. 2, the lower edge 30 of the sidewalls and end walls of the upper plate member has a generally flat surface which is provided with a single continuous open groove 32. In one sidewall, a branching passage 34 extends upward from the groove 32 and then outwardly to connect with a conduit 36. This latter conduit is connected through a valve 38 to a first source 40 of air pressure ($P_1$).

From a second source 42, air at a pressure $P_2$ is supplied through a valve 44 and an inlet conduit 46 in the transverse portion of the upper plate member 12 to the chamber 26. This latter source of pressure fills the chamber and presses the sludge 48 against the paper media 16 below, thereby extracting water from the sludge. As shown in FIG. 2, the pressure $P_1$ from the first source 40 travels through the inlet conduit 36, the sidewall passage 34 and into the sealing groove 32. Upon reaching the sealing groove, some of the air therefrom escapes outwardly, as indicated by the arrows 50. However, an equal or larger amount of $P_1$ air flows inwardly from the sealing groove 32 (as indicated by the arrows 52), and as it does, it passes around the inner corner of the sidewalls and up along their inside surfaces 54. This flow of air thus constantly cleans the inner sidewall surfaces and prevents the sludge from adhering to these surfaces as it dries. The pressure $P_1$ is always adjusted to be somewhat greater than the other pressure $P_2$, so the flow of $P_1$ air up along the wall surfaces is assured.

A typical sequence of events or steps for drying a quantity of sludge using the apparatus 10, according to the invention, is illustrated in FIGS. 3-5. In FIG. 3, the drier plates are together and the chamber 26 formed between them is being filled with undried sludge through the opening 28 in the upper plate member. In FIG. 4, the plates have been pressed tightly together and pressure from the two air sources is being applied, the pressure $P_1$ seals the periphery of the chamber 26 and "washes" the inner surfaces of the sidewalls, as previously described. The resulting total pressure $P_1$ and $P_2$ in the chamber continues to exert pressure against the body of sludge 48, thereby forcing water from it which passes through the porous media 16 and into the accumulating recesses 18 of the lower plate 14, which ultimately feed through an outlet passage 56 into a receiving receptacle 58.

After a period of time during which the sludge is subjected to a predetermined quantity of drying air, the plates 12 and 14 are separated after the chamber pressure has been reduced.

The paper media 16 carrying the now dried cake of sludge 48 is advanced, so that the cake can be broken up and removed to a storage or dump site. Since the sludge at this point has solidified to a cake and is almost totally free of moisture, its density is minimized and also in many instances any toxic substances were also removed with the water. Thus, the resulting sludge product is not only easier and lighter to handle, but in many instances it no longer is classified as a hazardous waste.

In situations where the sludge being processed is more apt to contain toxic substances, the same body of sludge within the chamber may be subjected to one or more "washing" cycles by supplying a charge of water before the air pressure is applied. The added water helps to separate the toxic products from the sludge which are then trapped in the water that passes through the carrier media 16 and is recovered. For particularly hazardous sludge products, as many as three or four water cycles may be used.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

What is claimed is:

1. A method for dewatering and drying sludge comprising the steps of:

providing a pair of upper and lower members adapted to contact each other at their periphery to form a closed chamber, said upper member having a transverse portion with continuous sidewalls that slope upwardly and inwardly, and said lower member having recesses in its upper surface connected to an outlet for collecting liquid extracted from the sludge;

providing a sheet of porous media over said lower member;

pressing the sidewalls of said upper member against said media and said lower member to seal said chamber;

supplying a charge of sludge to be dried to said chamber;

supplying air to a continuous groove in the lower edge of said sidewalls at first pressure level $P_1$ and causing at least a portion of the air at pressure $P_1$ to flow inwardly and upwardly along the sloped inner surfaces of the sidewalls of said closed chamber to prevent accumulated sludge therein from adhering to said sidewalls;

supplying air to said chamber at a second pressure level $P_2$ which is less than $P_1$;

maintaining the pressure $P_1$ and $P_2$ in said chamber until liquid is forced from said sludge through said media;

reducing said pressures $P_1$ and $P_2$ to zero;

separating said upper and lower members;

and advancing said media and the dried sludge to remove it from between said members.

2. The method as described in claim 1 including the step of supplying a charge of a cleansing liquid to the chamber after a first drying cycle while the sludge is still in the chamber and repeating the steps of applying air pressures $P_1$ and $P_2$ to force the charge of liquid through the sludge, thereby further removing additional substances from the sludge.

3. The method as described in claim 2 where said cleansing liquid is water.

4. A sludge drying apparatus comprising:

a pair of upper and lower plate members with a sheet of porous media therebetween, said upper and lower plate members being movable together to form a closed chamber, said upper member having a transverse cover portion with an opening into said chamber for receiving sludge to be dried and sidewalls extending from the periphery of said transverse portion, said sidewalls sloping downwardly and outwardly to a lower edge of said upper plate member portion, and said lower member having a peripheral portion to support said sidewalls of said upper member and recessed areas within said peripheral portion for trapping and removing moisture extracted from the sludge in said closed chamber;

an open groove in the bottom surfaces of said sidewalls and air passage means connected to said groove from an outside port on one said sidewall; means for supplying a first source of air connected to said outside port and thus to said groove, at least a portion of said air in said groove being adapted to flow inwardly and upwardly along the inside surface of said sidewalls as the sludge in said chamber is dried to prevent it from adhering to said inside surface when the upper and lower members are together and when they are later separated for removal of the dried sludge.

5. The apparatus as described in claim 4 including means for supplying a second source of air through said upper member to said closed chamber at a pressure somewhat less than air from said first source via said groove.

* * * * *